US006307384B2

(12) United States Patent
Havey et al.

(10) Patent No.: US 6,307,384 B2
(45) Date of Patent: *Oct. 23, 2001

(54) MICROPOWER CAPACITANCE-BASED PROXIMITY SENSOR

(75) Inventors: Gary D. Havey, Maple Grove; Steven A. Lewis, Edina, both of MN (US)

(73) Assignee: Honeywell International Inc., Morristown, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/227,140

(22) Filed: Jan. 7, 1999

(51) Int. Cl.[7] .................................................. G01R 27/26
(52) U.S. Cl. .............................................................. 324/662
(58) Field of Search .................................... 324/662, 671, 324/452; 348/341, 333; 396/114

(56) References Cited

U.S. PATENT DOCUMENTS

| Re. 30,916 | 4/1982 | McWaters . |
| 4,191,894 | 3/1980 | Noda et al. . |
| 5,200,774 | 4/1993 | Nakajima . |
| 5,313,305 | 5/1994 | Harigaya et al. . |
| 5,521,638 | 5/1996 | Dezaki et al. . |
| 5,526,082 | 6/1996 | Hirano . |
| 5,564,364 | 10/1996 | Kovacs et al. . |
| 5,570,156 | 10/1996 | Arai et al. . |
| 5,570,157 | 10/1996 | Konishi . |
| 5,570,158 | 10/1996 | Wakabayashi et al. . |
| 5,600,400 | 2/1997 | Wakabayashi et al. . |
| 5,606,390 | 2/1997 | Arai et al. . |
| 5,699,115 | * 12/1997 | Hiraki et al. .......................... 348/333 |
| 6,025,726 | * 2/2000 | Gershenfeld et al. ............... 324/671 |

FOREIGN PATENT DOCUMENTS 2243217A  10/1991  (GB) .

\* cited by examiner

*Primary Examiner*—Safet Metjahic
*Assistant Examiner*—James C Kerveros
(74) *Attorney, Agent, or Firm*—John G. Shudy, Jr

(57) ABSTRACT

The present invention is a proximity detector for an electronic device. The proximity detector utilizes two capacitors which share a common electrode. The two capacitors are located on the housing of the electronic device. The capacitors are arranged so that when the electronic device is used in its normal orientation, a portion of the operator's body will occlude one of the capacitors, but not the other. The close proximity of the operator's body will change the electric field surrounding the capacitor. Thus, the capacitance of the occluded capacitor will be different than the unencumbered capacitor. A detection circuit is coupled to the capacitors and to the power supply of the device. The circuit uses very little power, and maintains the electronic device in a standby or powered down mode. Only when the circuit detects a difference in the capacitance generated by the two capacitors, will it allow full power to be delivered to the electronic device.

28 Claims, 3 Drawing Sheets

MICROPOWER CAPACITANCE-BASED PROXIMITY SENSOR

The Government may have rights in this invention pursuant to Contract No. DAAK60-96-C-3023, awarded by the Department of the Army.

BACKGROUND OF THE INVENTION

Field of the Invention

Many modern electronic devices use batteries to provide power. The use of batteries is advantageous because it allows the device to be used virtually anywhere. People have become accustomed to using devices which use rechargeable or easily disposable batteries. These devices include digital cameras, video recorders, lap top computers and cellular phones. For many of these devices, power consumption is generally not a problem. The device is simply turned on when needed, used, and shut off when finished. Thus, the battery is only drained when the device is actually being used.

For some devices, the operator may wish to use the device for an extended period of time, but only on an intermittent basis. For instance, when traveling in darkness in an outdoor environment, a person might use a night vision monocular scope to clearly view selected objects. During actual movement, however, the person may find it awkward to constantly look through the device. To use the device most efficiently, the person may cease movement, raise the device to their eye, look through it, and subsequently return it to a carrying position. Then the person would continue moving. While this may be an efficient way of using the device, it is not an efficient way of using the power supply because, the device is constantly using power, even while in the carrying position.

One simple solution would be to simply turn the device on and off. However, this can be clumsy and awkward, thus slowing the person down and detracting them from other tasks. Furthermore, many battery powered devices have relatively long power up and power down periods. More sophisticated devices might even have software applications which must be booted. All this renders it impractical to consistently be turning such devices manually on and off.

To solve this problem, some devices have incorporated a switch near the eye piece. When the operator looks through the device, their head contacts the eye piece thus causing the switch to turn the power on. In devices with long power-up times, the eye piece does not turn the device entirely on and off, but rather switches it from a low to high power state.

While providing a relatively simple and economical solution to the problem, the use of such a switch has many drawbacks. In order to be comfortably used, the switch must be relatively easy to engage. As such, many types of unintended contact will turn the device on and off. For instance, when carrying the monocular night vision scope in their hand, a person may bump the eye piece against their leg or other portion of their body thus inadvertently turning the device on. If such inadvertent contacts are frequent, there will not be any savings in power consumption from the incorporation of such a switch. An additional problem exists for users of such devices who wear eye glasses. The eye piece of the device must be pressed firmly up against the glasses, thus causing the glasses to press into the operator's head, which may cause pain or discomfort.

Another power reduction device is the use of an infrared sensor incorporated near the electronic device. The eye detector may detect heat from a person in close proximity or actually emit infrared beams and detect their reflection to determine when the device should be powered up. Simply detecting heat from a person is not always efficient because heat is generated by every portion of the body. Once again, causing the device to be powered up when it is not actually intended to be used, thus wasting power. Emitting infrared beams to detect the reflection causes two separate problems. First the emitter-detector uses a relatively high amount of power itself, thus negating many of the benefits intended to be derived. Second, such projected infrared beams can be detected by many extraneous sources, which is of particular concern when these devices are used in military operations.

With both the heat sensor and the emitter/detector combination, a problem exists for people who wear eye glasses as the lenses of the glasses may deflect infrared radiation thus preventing the detector from noting their presence and turning the device on.

Some electronic devices may use a complicated eye-imaging detector. Such a detector also suffers in that it uses a relatively large amount of power. In addition, the optics required to perform such imaging often increase the size of the device beyond what is commercially desired. Therefore, there exists a need to provide a simple and efficient proximity detector which brings the device from a low power usage state to a high power usage state.

SUMMARY OF THE INVENTION

The present device uses capacitive plates located near the eyepiece of an electronic device. The capacitive plates are connected to relatively simple circuitry which uses a minimal amount of power. Three capacitive plates forming two capacitors are placed near the eyepiece. The two capacitors share the middle plate. The capacitive plates are aligned with respect to the eyepiece in such a way that when the operator looks at the eyepiece, their nose and cheek will cover one, but only one, of the capacitors. When the electronic device is in a stand-by or powered down mode, with no object in front of either capacitor, the output of both capacitors will be identical. When raised to eye level and one of the capacitors is covered by the operator's face, the electric field surrounding the covered capacitor changes. Thus, that capacitor will have a different output than the uncovered one. This differential in capacitance is registered by the circuitry and the device is powered up. When the device is in stand-by mode and the operator inadvertently covers both capacitors, for example, by resting the device against his leg, the device will not unintentionally be powered up. This is because if both capacitors are covered by the same object, the capacitance of both capacitors will be identical and hence there will be no differential.

It is an object of the present invention to provide a proximity detector for an electronic device which conserves power.

It is another object of the present invention to provide a proximity detector which, when activated brings an electronic device from a low-or no-power status to a powered on status.

It is a further object of the present invention to provide a proximity detector which reliably powers on the electronic device only when the device is actually intended to be used.

It is yet a further object of the present invention to provide a proximity detector which minimizes the occurrence of a false detection.

It is still another object of the present invention to provide a proximity detector that uses very little power.

It is still yet another object of the present invention to provide a proximity detector which is not affected by the use of eyeglasses.

It is a further object of the present invention to provide a proximity detector which occupies a relatively small amount of space within an electronic device.

DETAILED DESCRIPTION OF PREFERRED EMBODIMENTS

Figure 1:
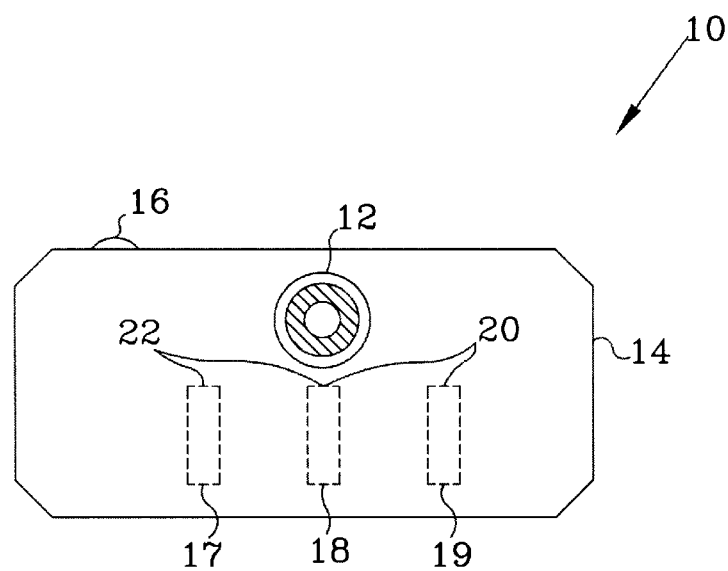
FIG. 1 shows a front view of an electronic device using the differential capacitors of the present invention which are shown in sectional line.

Turning now to FIG. 1, a first embodiment of the present invention will be described in which like reference numerals will be used to describe like elements. An electronic device 10 has a housing 14 and an eyepiece 12 medially disposed thereon. Electronic device 10 is meant to be representative of a wide variety of commercially available electronic products. For example, the monocular arrangement shown could be used with a night vision scope, a video camera, a digital camera or any other type of hand-held portable electronic display. Though not shown, housing 14 could be configured to be used with a binocular arrangement, or a device which does not use an eyepiece at all, such as a cellular phone. A first electrode 17, a second electrode 18 and a third electrode 19 are spaced in parallel arrangement within housing 14. The three electrodes 17, 18, 19 in turn form a first capacitor 20 and a second capacitor 22. These two separate capacitors have one electrode 18 in common.

Figure 2:
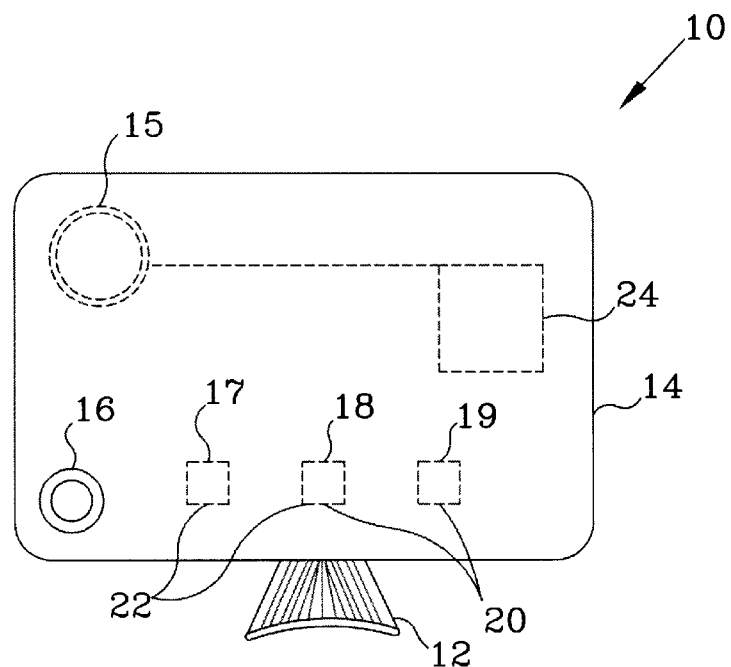
FIG. 2 is a top view of the electrical device using the differential capacitor of the present invention.

Within FIG. 2 is shown a proximity detection circuit 24 as it is connected to a power supply or battery 15. Proximity detection circuit 24 serves to detect a differential in capacitance between capacitor 20 and capacitor 22. If such a differential is detected, power is allowed to flow from battery or power source 15 to power up the electronic device 10.

Figure 3:
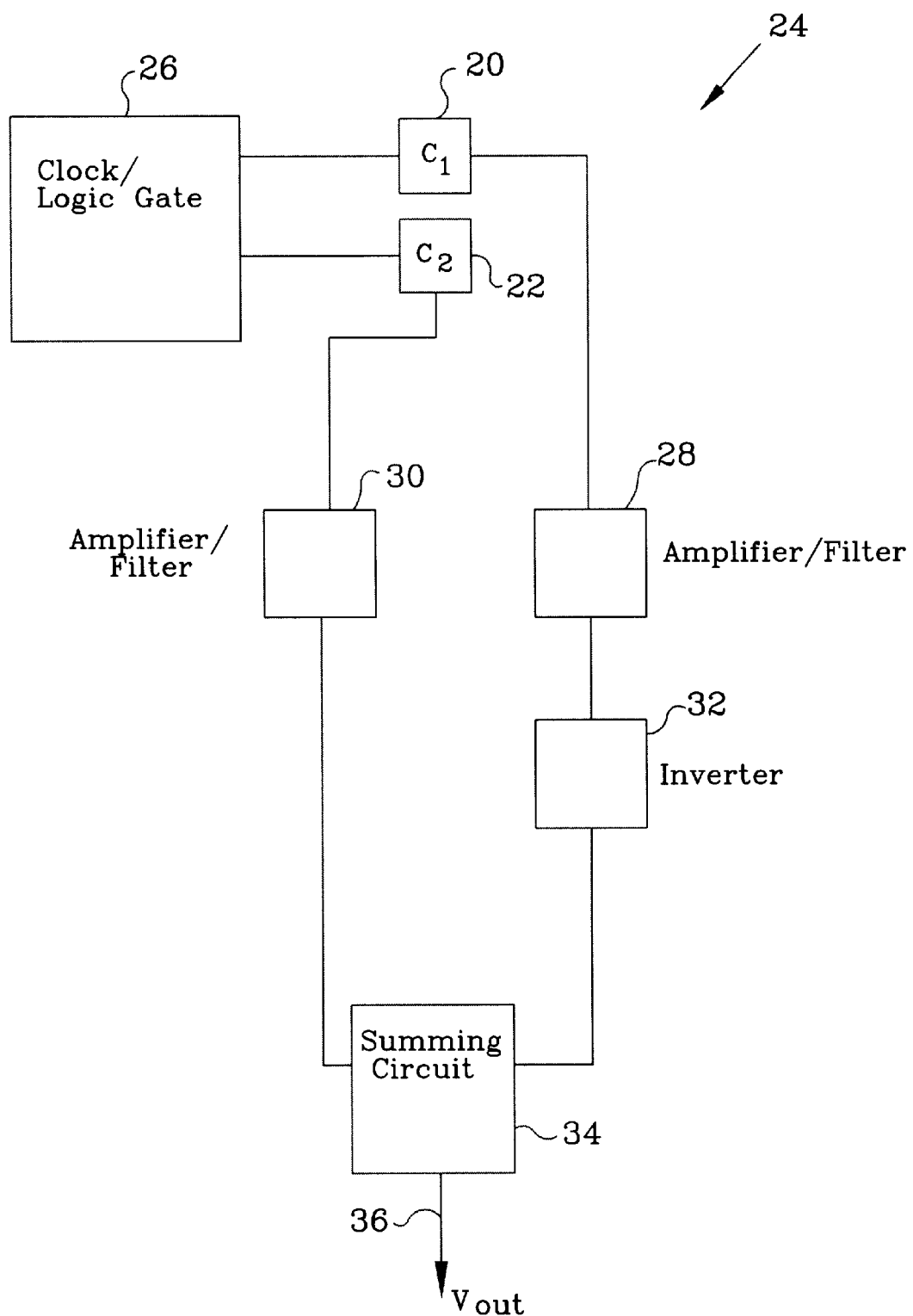
FIG. 3 is a block diagram of the circuitry of the differential capacitive analyzer of the proximity detector.

The general operation of the proximity detection circuit 24 will be explained with reference to the block diagram of FIG. 3. Clock circuit/logic gate 26 provides a logic signal to first capacitor 20 and second capacitor 22. The capacitance of first capacitor 20 and second capacitor 22 are converted into a current and pass to their respective amplifier/filter circuits 28 and 30. The signal from first capacitor 20 is then run through an inverter circuit 22. This inverted signal and the signal from capacitor 22 are directed into a summing circuit 34. In a stand-by mode, the output from capacitor 20 and capacitor 22 should be the same. Therefore, when the signal for one is inverted and added to the other, the net result is zero. When the net result is zero, summing circuit 34 outputs a predetermined output 36. If the capacitance of the first capacitor 20 and second capacitor 22 are not identical, then when one signal is inverted and both are summed together, the net result will be something other than zero and the output of the summing circuit 34 will trigger the electronic device 10 to be powered up.

Figure 4:
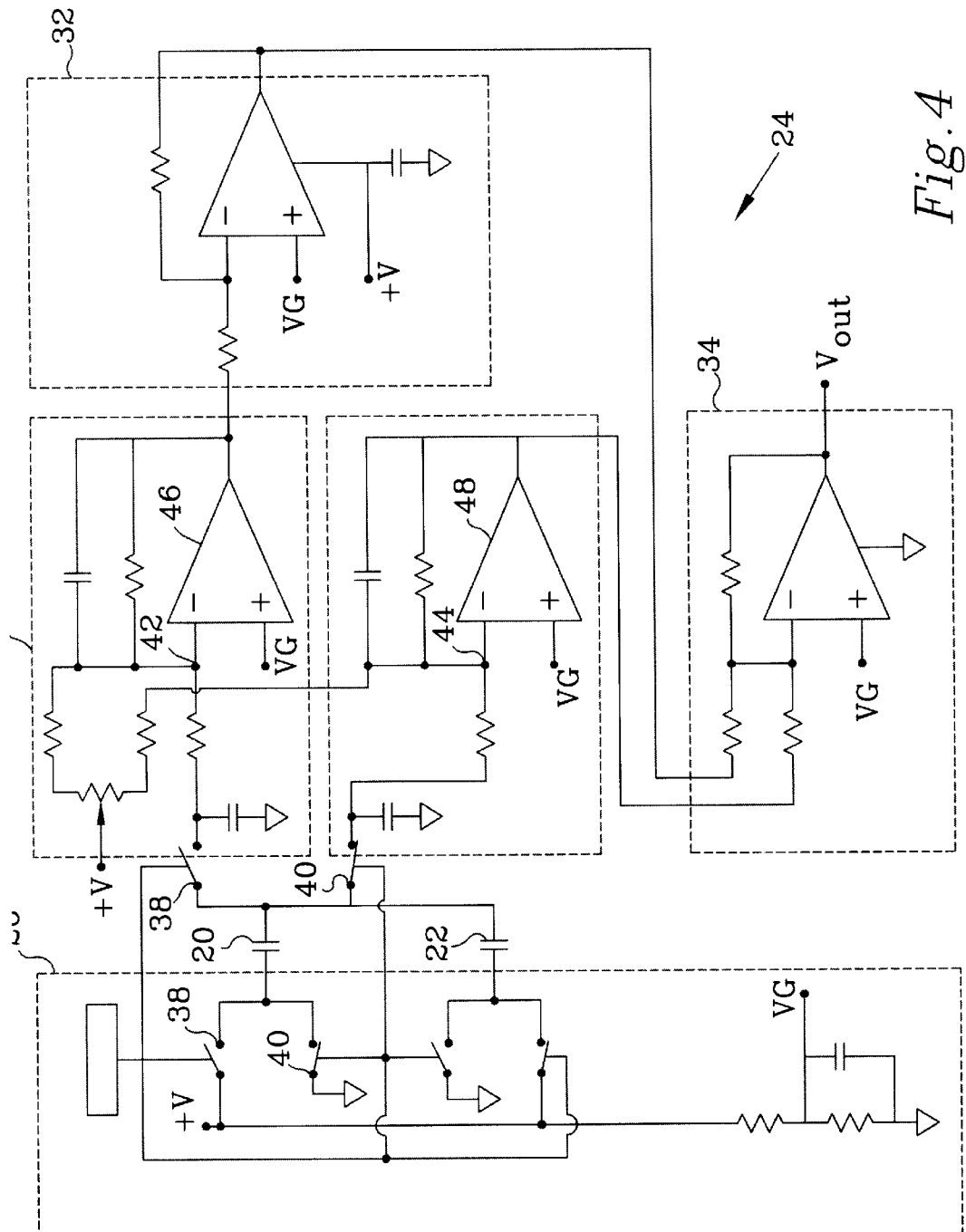
FIG. 4 is a circuit diagram of a differential capacitive analyzer of the proximity detector.

The detailed operation of one embodiment of the proximity detection circuit 24 will be explained with reference to FIG. 4. With reference to capacitor 20, when the logic signal from clock 26 is high, the upper set of switches 38 are closed, and the lower set of switches 40 are open. Alternatively, when low, the lower set of switches 40 are closed and the upper set of switches 38 are open. The left side of the switches 38, 40 therefore get connected to a power supply V, while the right side of the switch is at virtual ground. The current that flows in the course of charging the capacitor 20, flows toward a first summing junction 42. When the control signal from clock 26 goes low, the left side of the capacitor 20 gets connected to ground while the right side remains at the virtual ground. The current required to reverse the polarity on capacitor 20 comes from a second summing junction 44. The voltages at the outputs of the two amplifiers 46, 48 therefore go in opposite directions in response to the charge that is transferred from the capacitor 20.

Capacitor 20 and capacitor 22 share one electrode 18, that electrode being located medially between the two capacitors. The explanation as to capacitor 20 also applies to capacitor 22 except that the polarity of the charge transfer is reversed. While the first pair of electrodes (capacitor 20) is injecting current into the upper summing junction, the second pair of electrodes (capacitor 22) is extracting current from this same junction. This differential arrangement thus rejects the capacitance that is common to the capacitors 20 and 22 and shows only the differences. Of course, the same arrangement could be made using two separate and distinct capacitors wherein an electrode from each capacitor is electrically connected, thus arriving at the same shared electrical configuration.

To create a single output which represents the capacitance, the signal from amplifier 46 is inverted (with respect to the virtual ground) by inverter 32. Then it is added to the signal from amplifier 48 by summing circuit 34. The clock feed-through and charge injection errors that the switches introduce are common mode signals insofar as amplifiers 46,48 are concerned, so these errors cancel out after one signal is inverted and added to the other.

Referring back to FIG. 1, the operation of the electronic device 10 will be explained. To use the electronic device 10, a master power switch is turned on, thereby providing power to the proximity detector circuit 24. In devices which require a relatively long power up period, this would occur now, then the system would switch to a power conserving standby mode. When the operator wishes to use the electronic device 10, it is simply raised to eye level. As the operator looks through eyepiece 12, his nose and cheek will occlude one of the capacitors 20,22. As a result, the electric field surrounding the occluded capacitor will change, thus generating a differential which is detected by the circuit 24. This triggers the circuit 24 to allow the electronic device to obtain full power and perform its predetermined function. When the task is complete, the operator simply lowers the electronic device 10. Since both capacitors 20,22 are once again subject to the same electric field, there is no longer a differential to be detected by the circuit 24. As such, the circuit 24 triggers the device 10 to return to a low or no-power status.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited in the particular embodiments which have been described in detail therein. Rather, reference should be made to the appended claims as indicative of the scope and content of the present invention.

What is claimed is:

1. A capacitance based power control device for detecting the presence of a users body in a predetermined position proximate one of a plurality of capacitors and thus causing power to be supplied, the power control device comprising:

an electronic device requiring power for operation;

a power supply for selectively supplying power to the electronic device;

a first capacitor within the electronic device proximate the predetermined position;

a second capacitor coupled and positioned adjacent to the first capacitor such that the presence of the user's body in the predetermined position will effect the capacitance of the first capacitor or the second capacitor, but not both; and a circuit, coupled to the first and second capacitor to detect a capacitance mismatch between the first and second capacitors, the circuit providing a first output when the capacitance mismatch does not exist, and a second output when the capacitance mismatch does exist, wherein the circuit is coupled between the power supply and the electronic device so that power is supplied to the electronic device only when the circuit provides the second output.

2. The power control device of claim 1, further comprising:

a housing, the housing containing the electronic device, the first capacitor, the second capacitor, the circuit, and the power supply.

3. The power control device of claim 2, further comprising:

an outer wall, the outer wall providing one surface of the housing; and the first capacitor and the second capacitor are proximate the outer wall.

4. The power control device of claim 3, further comprising:

an eyepiece, the eyepiece coupled to the outer wall and the electronic device, the eyepiece positioned adjacent both the first capacitor and the second capacitor such that the first capacitor and the second capacitor are on opposite sides of the eyepiece so that when an operator views through the eyepiece, either the first capacitor or the second capacitor, but not both, is occluded by a portion of the operator's face thus causing the capacitance mismatch.

5. The power control device of claim 4, wherein the electronic device is a digital camera.

6. The power control device of claim 4, wherein the electronic device is a video camera.

7. The power control device of claim 4, wherein the electronic device is a monocular scope.

8. The power control device of claim 7, wherein the monocular scope is a night vision device.

9. The power control device of claim 4, wherein the electronic device is a binocular device.

10. The power control device of claim 4, wherein the electronic device is a portable computer display.

11. The power control device of claim 2, wherein the power supply is a battery.

12. The power control device of claim 11, wherein the battery is rechargeable.

13. A proximity detector for detecting the presence of a user in a predetermined location adjacent to an electronic device, comprising:

a housing, the housing containing the electronic device;

a power supply, the power supply providing power to the electronic device, and mounted within the housing;

a first electrode, a second electrode and a third electrode mounted in an outer wall of the housing;

a first capacitor comprised of the first electrode and the second electrode;

a second capacitor comprised of the second electrode and the third electrode, the first electrode, second electrode and third electrode positioned within the housing such that the presence of the user at the predetermined location will effect either the first capacitor or the second capacitor, but not both;

a proximity detection circuit coupled to the electronic device, the first capacitor, the second capacitor, and to the power supply, the proximity detection circuit including:

a logic gate driven by a clock, the logic gate coupled to the first capacitor and the second capacitor, and receiving power from the power supply, the logic gate and clock providing an input signal into the first capacitor and the second capacitor;

a first amplifier and filter coupled to the first capacitor for receiving a first signal from the first capacitor, and providing a first output;

a second amplifier and filter coupled to the second capacitor for receiving a second signal from the second capacitor, and providing a second output;

an inverter coupled to the second amplifier and filter, for inverting the second output; and a summing circuit, the summing circuit coupled to the inverter and the first amplifier and filter, wherein the summing circuit produces a first control signal when the first output is equal to the second output, and produces a second control signal when the first output is not equal to the second output;

wherein, the electronic device only receives full power from the power supply when the summing circuit generates the second output.

14. The proximity detector of claim 13, further comprising an eyepiece, the eyepiece coupled to the housing, wherein the first, second, and third electrodes are mounted in the housing in a configuration relative to the eyepiece, so that when an operator views through the eyepiece, two, but only two, of the electrodes are occluded by a portion of the operator's face.

15. The proximity detector of claim 13, wherein the electronic device is changed from a no-power status to a full power status by the summing circuit.

16. The proximity detector of claim 13, wherein the electronic device is changed from a low power status to a full power status by the summing circuit.

17. The proximity detector of claim 13, wherein the power supply includes a battery.

18. The proximity detector of claim 17, wherein the battery is rechargeable.

19. A proximity based power system for use in automatically activating an electronic device in response to the presence of a user at a predetermined location relative to the electronic device, the power system comprising:

a first electrode mounted within a housing;

a second electrode mounted with the housing on a first side of the first electrode;

a third electrode mounted within the housing on a second side of the first electrode, the second side being opposite the first side;

a capacitance mismatch detection circuit for monitoring a first capacitance level between the first electrode and the second electrode, and for monitoring a second capacitance between the first electrode and the third electrode, the capacitance mismatch detection circuit for producing a first output signal when the first capacitance and the second capacitance are substantially equal, and producing a second output signal when the first capacitance and the second capacitance are mismatched due to the presence of the user at the predetermined location;

a power supply; and a power controller coupled to the output of the power supply and the mismatch detection circuit, wherein the power controller will allow power to be applied to the electronic device when the second output signal is present.

20. The proximity detector of claim 19, wherein the electronic device is a digital camera and the predetermined location at an eyepiece of the digital camera.

21. The proximity detector of claim 19, wherein the electronic device is a video camera and the predetermined location at an eyepiece of the video camera.

22. The proximity detector of claim 19, wherein the electronic device is a monocular scope and the predetermined location at an eyepiece of the monocular scope.

23. The proximity detector of claim 22, wherein the monocular scope is a night vision device.

24. The proximity detector of claim 19, wherein the electronic device is a binocular device and the predetermined location at an eyepiece of the binocular device.

25. The proximity detector of claim 19, wherein the electronic device is a portable computer display and the predetermined location at an eyepiece of the portable computer display.

26. The proximity detector of claim 19, wherein the power supply is a battery.

27. The proximity detector of claim 26, wherein the battery is rechargeable.

28. A power up system for activating an electronic device when the user is detected to be using an eyepiece of the electronic device and deactivating the electronic device when the user is no longer using the eyepiece, the power up system comprising:

a clocking circuit for providing an driving signal;

a first capacitor positioned adjacent the eyepiece and attached to the clocking circuit so as to receive the driving signal;

a second capacitor positioned adjacent the eyepiece and opposite the first capacitor, the second capacitor is attached to the clocking circuit so as to receive the driving signal, the first capacitor and the second capacitor having substantially equal capacitance values when a user is not using the eye piece, but having different capacitance values when the user is using the eyepiece;

a first amplifier coupled to the first capacitor to receive a first capacitor signal from the first capacitor and produce a first amplifier output signal proportional to the first capacitor signal;

a second amplifier coupled to the first capacitor to receive a second capacitor signal from the second capacitor and produce a second amplifier output signal proportional to the second capacitor signal;

an inverter coupled to the second amplifier to receive the second amplifier output signal and produce an inverted signal; and a summing circuit for receiving the first amplifier output and the inverted signal and producing a summing output equal to the sum of the first amplifier output and the inverted signal, wherein the summing output is substantially zero when the first capacitance and second capacitance are substantially equal, and wherein the summing output is a non-zero value when either the first capacitor or the second capacitor are occluded by the user, the non-zero value being output to the electronic device causing the electronic device to be activated.

* * * * *